United States Patent [19]
Janiszewski

[11] 4,376,475
[45] Mar. 15, 1983

[54] SYNCHRONIZER FOR MOTOR VEHICLE GEARBOXES

[75] Inventor: Gregorz K. Janiszewski, Angered, Sweden

[73] Assignee: AB Volvo, Gothenburg, Sweden

[21] Appl. No.: 217,179

[22] Filed: Dec. 16, 1980

[30] Foreign Application Priority Data

Dec. 20, 1979 [SE] Sweden .................................. 7910540

[51] Int. Cl.³ .............................................. F16D 23/06
[52] U.S. Cl. ..................................... 192/53 F; 74/339
[58] Field of Search .............. 192/53 F, 53 G, 53 E; 74/339

[56] References Cited

U.S. PATENT DOCUMENTS

| | | | |
|---|---|---|---|
| 1,931,288 | 10/1933 | Griswold | 192/53 F |
| 1,995,116 | 3/1935 | Drissner | 29/173 |
| 2,110,964 | 3/1938 | Ridgeway | 192/53 F |
| 2,339,969 | 1/1944 | White | 192/53 F |
| 2,798,718 | 7/1957 | Gross | 267/1 |
| 2,942,712 | 6/1960 | Altmann | 192/53 F X |
| 3,057,447 | 10/1962 | Peras | 192/53 E |
| 3,459,286 | 8/1969 | Cordiano | 74/339 X |
| 3,795,293 | 3/1974 | Worner | 192/53 F |

FOREIGN PATENT DOCUMENTS

| | | | |
|---|---|---|---|
| 1817166 | 7/1970 | Fed. Rep. of Germany . | |
| 1910884 | 9/1970 | Fed. Rep. of Germany .... | 192/53 F |
| 1000494 | 8/1965 | United Kingdom ............ | 192/53 F |

*Primary Examiner*—Allan D. Herrmann
*Attorney, Agent, or Firm*—Young & Thompson

[57] ABSTRACT

In a synchronizer for vehicle gearboxes, a synchronizing ring has an external synchronizing cone which cooperates with an internal synchronizing cone on a shifting sleeve. The ring cone is made on an axial flange which extends from a radial web and is directed towards the shifting sleeve. An annular spring presses against the web and loads the synchronizing ring symmetrically.

5 Claims, 9 Drawing Figures

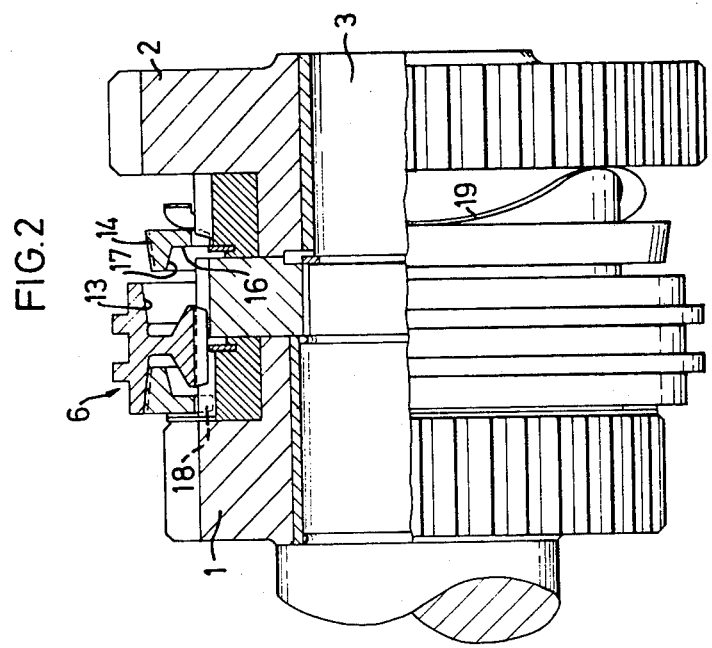
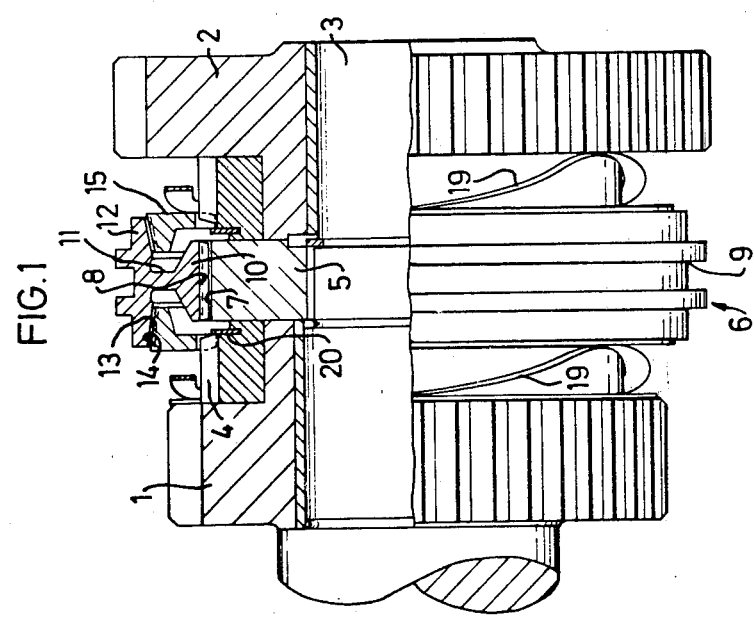

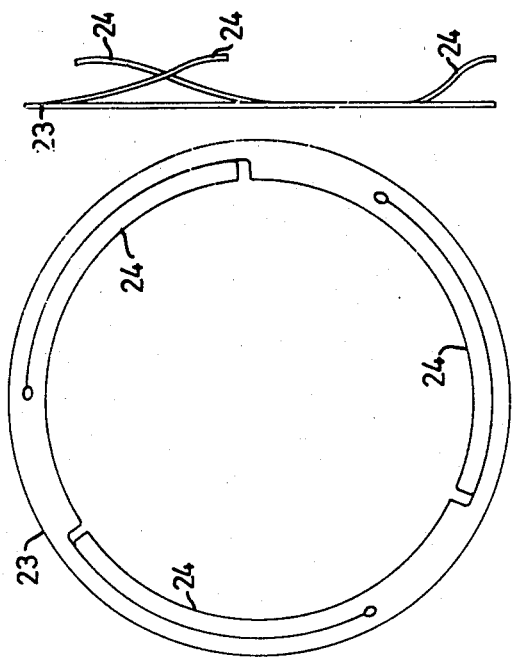
FIG.6a
FIG.6
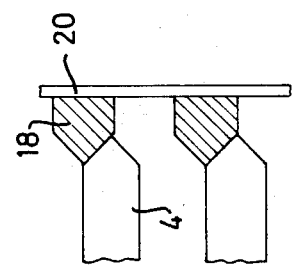
FIG.3
FIG.4a
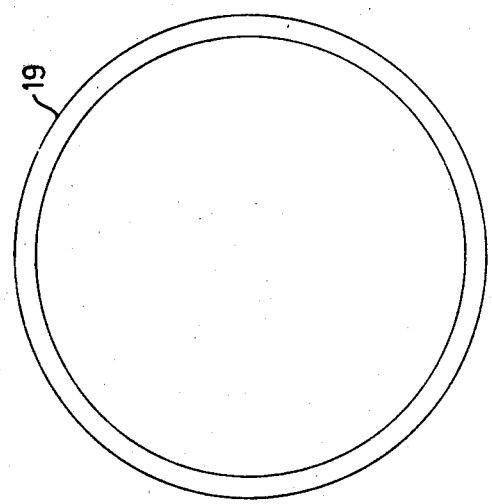
FIG.4

SYNCHRONIZER FOR MOTOR VEHICLE GEARBOXES

The present invention relates to a synchronizer for a motor vehicle gearbox for synchronizing the rotational speed of a gear provided with engaging teeth and rotatably mounted on a shaft and a shifting sleeve provided with corresponding engaging teeth and non-rotatably but axially displaceably mounted on the shaft; comprising a synchronizing ring arranged between the gear and the shifting sleeve, said ring having a radial web with internal teeth for engaging the teeth of the gear and an axially directed flange extended from the web, the outer limiting surface of which forms a conical friction surface for engaging a corresponding internal friction surface on the shifting sleeve, the synchronizing ring being loaded in a direction towards the shifting sleeve by spring means pressing against the ring.

Synchronizers of this type permit larger diameters of the frictional surfaces than do synchronizers for example in which the gear is made with an external frictional surface or synchronizing cone for inter-action with an internal frictional surface or synchronizing cone on a synchronizing ring. The advantage of a larger diameter of the synchronizing surfaces is that the shifting forces are reduced. Another advantage over other types of synchronizers is that the number of parts is small and therefore the price can be kept relatively low.

One of the disadvantages of the known constructions of the type described in the introduction is, however, that they have a considerably greater axial dimension than other known types. For example, in a known construction according to U.S. Pat. No. 3,459,286 the respective synchronizing rings are loaded by an open helical spring. The synchronizing ring is made so that when the gear is engaged, the compressed spring will lie in the space between the synchronizing cone and the engaging teeth of the gear. In addition to the fact that this solution requires a large axial space, it also results in non-symmetric loading of the synchronizing ring. Another disadvantage is that considerable friction occurs between spring, synchronizing ring and engaging teeth, which requires heavy pretensioning which makes shifting more difficult and increases wear between the shift fork and shifting sleeve.

The purpose of the present invention is to remove the above-mentioned disadvantages and produce a synchronizer of the type described in the introduction, which can be made with the same or even a smaller axial dimension than for example a synchronizer with an internal cone on the ring and an external cone on the gearwheel.

This is achieved according to the invention by the axial flange of the synchronizing ring being directed towards the shifting sleeve and the ring being symmetrically loaded by annular spring means arranged coaxially with the shaft.

The invention is based in principle on the idea of turning the synchronizing ring in the synchronizer shown in U.S. Pat. No. 3,459,286 in the opposite direction and using the space radially inside the synchronizing cone not for a spring but for a portion of the hub of the shifting sleeve. This is possible according to the invention by virtue of the fact that the helical spring is replaced by an annular spring member, e.g. a waveshaped spring ring which takes up very little axial space when compressed.

The invention will be described in more detail with reference to embodiments shown in the accompanying drawings.

FIG. 1 shows a partial sectional side view of the synchronizer according to the invention in the neutral position.

FIG. 2 is a view corresponding to FIG. 1 with the gear engaged.

FIG. 3 is a view illustrating the engagement between the engaging teeth of the synchronizing ring and the gear.

FIGS. 4–6 are different embodiments of springs for the synchronizing ring as viewed straight out and from the side.

Figure 5A:
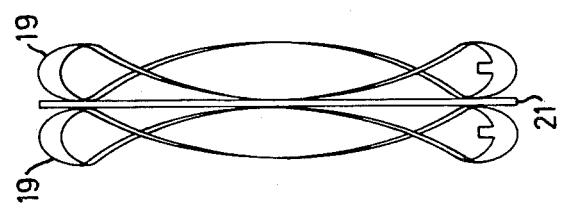

In FIGS. 1 and 2, two gears 1 and 2 are rotatably mounted by means of bushings or needle bearings on a main shaft 3 in a gearbox (not shown in more detail here). Each gear 1 and 2 is non-rotatably joined to an individual engaging ring 4. Between the gears there is a hub 5 for a shifting sleeve 6. The hub 5 is non-rotatably joined to the shaft 3 via splines and it is made with external teeth or cogs 7 which engage corresponding internal teeth or cogs 8 on the shifting sleeve 6, thus making it nonrotatable but axially displaceable on the shaft 3. By sliding the shifting sleeve 6 axially so that its teeth 8 engage the teeth 4 of one of the gears 1 or 2, the gears can be selectively locked to the shaft 3. This displacement is achieved in a known manner with the aid of a shift fork (not shown) engaging in a groove 9 in the shifting sleeve 6.

As can be seen from FIGS. 1 and 2, the shifting sleeve 6 has an essentially T-shaped cross section consisting of a toothed portion 10, a narrow web 11 and a pair of axial flanges 12. The interior limiting surface 13 of the flanges 12 forms a friction surface or synchronizing cone, which cooperates with the corresponding frictional surface or synchronizing cone 14 on a synchronizing ring 15. The ring 15 has an L-shaped cross section formed by a web 16 and a flange 17, the outer limiting surface of which forms the cone 14. The synchronizing ring 15 is made with internal teeth or cogs 18, which cooperate with teeth 4 on the associated gear 1,2, as shown in FIG. 3. A spring 19 loads the ring 15 in the direction towards the sleeve 6, and a lock ring 20 forms a stop which limits the displacement of the ring 15 towards the sleeve. The components are adapted so that there is a small clearance between the cones 13 and 14 when the shifting sleeve 6 is in the neutral position shown in FIG. 1 and the ring 15 abuts the lock ring 20.

The spring 19 is a spring ring bent in a wave shape, as shown in detail in FIG. 4. The special features of such a spring are that it can be made so that it loads the synchronizing ring 15 symmetrically and that it is very thin when compressed, i.e. only as thick as the thickness of the ring. Furthermore, the friction between the spring, synchronizing ring and engaging teeth is small, allowing less spring pretensioning, which results in less wear between fork and shifting sleeve. The spring is also easy to mount and can be used at high rotational speeds and with a synchronizing ring of large diameter.

Figure 5:
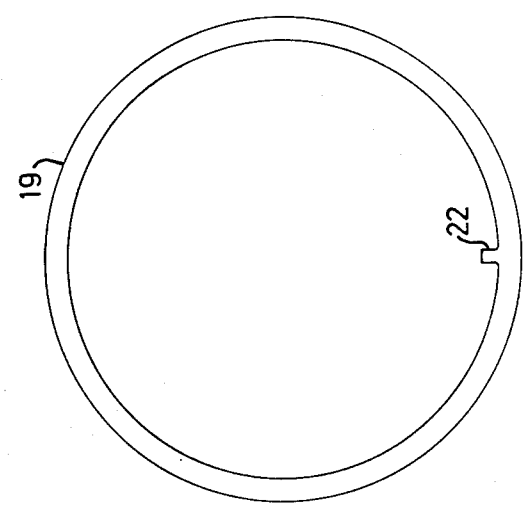

FIG. 5 shows a spring embodiment which uses two wave shaped spring rings 19 with an intermediate flat ring 21. The spring rings 19 are made with a radial projection 22 which is intended to engage between the engaging teeth 4 of the gear 1,2 to prevent the rings 19 from turning in relation to each other.

FIG. 6 shows still another spring embodiment. A flat spring ring 23 is cut so as to form three arcuate tongues 24. These are bent out so that resilient portions are formed which load the synchronizing ring symmetrically.

As was mentioned above, there is a small clearance between the synchronizing cones 13,14, when the shifting sleeve 6 is in a neutral position shown in FIG. 1. If a gear is to be engaged, which involves locking the gear 1 to the main shaft, the shifting sleeve 6 is moved by means of a shift fork (not shown) to the left in FIG. 1. When the cones 13,14 make contact, the synchronizing ring 15 adpots a position so that its engaging teeth 18 will abut the engaging teeth 4 of the gear 1 (FIG. 3), which results in the shifting sleeve 6 initially being prevented from engaging the teeth 4 of the gear 1. Due to the friction between the cones 13,14, the gear 1 and the shifting sleeve will have the same speed after a short time. The blocking force thus disappears, so that the shifting sleeve 6 can turn back the synchronizing ring 15 one half tooth width to remove its locking function, and the synchronizing ring 15 and the shifting sleeve can be moved into the position shown in FIG. 2 with the spring 19 compressed. When the shifting sleeve 6 is moved back to the neutral position, the synchronizing ring 15 is moved back to the abutment formed by the lock ring 20 under the influence of the spring 19.

What I claim is:

1. In a synchronizer formotor vehicle gearboxes for synchronizing the rotational speed of a gear provided with engaging teeth and rotatably mounted on a shaft and a shifting sleeve provided with corresponding engaging teeth and nonrotatably but axially displaceably mounted on the shaft, comprising a synchronizing ring arranged between the gear and the shifting sleeve, said ring having a radial web with internal teeth for engaging the engaging teeth of the gear and an axially directed flange extending from the web, the outer limiting surface of said flange forming a conical friction surface for engaging a corresponding internal frictional surface on the shifting sleeve, the synchronizing ring being loaded in the direction towards the shifting sleeve by spring means pressing against the ring; the improvement in which the axial flange of the synchronizing ring is directed towards the shifting sleeve, and the ring is symmetrically loaded by annular spring means arranged coaxially with the shaft and supported by the engaging teeth of the gear.

2. A synchronizer according to claim 1, characterized in that said annular spring means are formed of at least one wave shaped spring ring.

3. A synchronizer according to claim 1, characterized in that said annular spring means are formed of at least one slotted spring ring from which arcuate spring tongues are bent out.

4. A synchronizer according to any one of claims 1-3, characterized in that the engaging teeth of the shifting sleeve are made on a hub portion, from which there extends a radial web which carries an axial flange, the inner limiting surface of which forms the frictional surface, said web being substantially narrower than the hub portion, so that the edge of the frictional surface closest to the web lies in a plane inside the outer edge of the hub portion.

5. A synchronizer according to claim 1, characterized in that said annular spring means are located between, and are in simultaneous contact with, the gear teeth and the synchronizing ring.

* * * * *